United States Patent
Schlumpf

(10) Patent No.: US 11,046,874 B2
(45) Date of Patent: Jun. 29, 2021

(54) SEALANT FOR FLOOR JOINTS WITH A HIGH RESISTANCE TO FUELS

(71) Applicant: SIKA TECHNOLOGY AG, Baar (CH)

(72) Inventor: Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/777,039

(22) PCT Filed: Dec. 20, 2016

(86) PCT No.: PCT/EP2016/081846
§ 371 (c)(1),
(2) Date: May 17, 2018

(87) PCT Pub. No.: WO2017/108742
PCT Pub. Date: Jun. 29, 2017

(65) Prior Publication Data
US 2018/0334600 A1    Nov. 22, 2018

(30) Foreign Application Priority Data

Dec. 21, 2015 (EP) .................................... 15201584

(51) Int. Cl.

| | | |
|---|---|---|
| C09J 175/06 | (2006.01) | |
| C08G 18/48 | (2006.01) | |
| C08G 18/76 | (2006.01) | |
| C08G 18/42 | (2006.01) | |
| C08G 18/28 | (2006.01) | |
| C09J 175/04 | (2006.01) | |
| C08G 18/12 | (2006.01) | |
| C08G 18/30 | (2006.01) | |
| C04B 41/00 | (2006.01) | |
| C04B 41/48 | (2006.01) | |
| C04B 41/63 | (2006.01) | |
| C08K 3/26 | (2006.01) | |
| C08K 5/435 | (2006.01) | |
| C09J 11/04 | (2006.01) | |
| C09J 11/06 | (2006.01) | |

(52) U.S. Cl.
CPC ........... *C09J 175/06* (2013.01); *C04B 41/009* (2013.01); *C04B 41/4884* (2013.01); *C04B 41/63* (2013.01); *C08G 18/12* (2013.01); *C08G 18/288* (2013.01); *C08G 18/307* (2013.01); *C08G 18/42* (2013.01); *C08G 18/4804* (2013.01); *C08G 18/4829* (2013.01); *C08G 18/7614* (2013.01); *C08G 18/7621* (2013.01); *C08G 18/7664* (2013.01); *C08K 3/26* (2013.01); *C08K 5/435* (2013.01); *C09J 11/04* (2013.01); *C09J 11/06* (2013.01); *C09J 175/04* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 4,390,678 A | 6/1983 | LaBelle et al. | |
| 4,812,524 A | 3/1989 | Baghdachi | |
| 2003/0149167 A1* | 8/2003 | Chew ................. | C08G 18/4812 524/589 |
| 2013/0216840 A1* | 8/2013 | Radhakrishnan ....... | C03C 27/10 428/425.6 |
| 2014/0137975 A1 | 5/2014 | Klug et al. | |
| 2014/0364556 A1* | 12/2014 | Issel ........................ | C08L 75/04 524/507 |
| 2015/0291863 A1* | 10/2015 | Sophiea ............... | C08G 18/289 156/331.4 |
| 2016/0145476 A1* | 5/2016 | Jordan, Jr. .......... | C08G 18/7671 210/500.23 |

FOREIGN PATENT DOCUMENTS

| | | |
|---|---|---|
| CN | 103314029 A | 9/2013 |
| JP | S49-034947 A | 3/1974 |
| JP | H04-202283 A | 7/1992 |
| JP | 2001-019734 A | 1/2001 |
| JP | 2007-231096 A | 9/2007 |
| WO | 02/48228 A2 | 6/2002 |
| WO | 2012/049287 A1 | 4/2012 |

OTHER PUBLICATIONS

Feb. 10, 2017 International Search Report issued in International Patent Application No. PCT/EP2016/081846.
Jun. 26, 2018 International Preliminary Report on Patentability issued in International Patent Application No. PCT/EP2016/081846.
Jul. 7, 2020 Office Action issued in Australian Patent Application No. 2016376643.
Aug. 4, 2020 Office Action issued in Chinese Patent Application No. 201680074641.9.

* cited by examiner

*Primary Examiner* — Callie E Shosho
*Assistant Examiner* — John Vincent Lawler
(74) *Attorney, Agent, or Firm* — Oliff PLC

(57) ABSTRACT

A polyurethane composition having a) 5 to 40 wt. %, based on the total polyurethane composition, of at least one polyol P; b) 25 to 75 wt. %, based on the total polyurethane composition, of at least one filler F; c) 0.5 to 10 wt. %, based on the total polyurethane composition, of at least one polyisocyanate I; and d) 10 to 40 wt. %, based on the total polyurethane composition, of at least one plasticizer W. The plasticizer W has at least one sulfonamide. Compositions according to the invention are suitable in particular as adhesives or sealants, in particular joint sealants, and have an excellent resistance against fuels.

19 Claims, No Drawings

SEALANT FOR FLOOR JOINTS WITH A HIGH RESISTANCE TO FUELS

TECHNICAL FIELD

The invention relates to moisture-curing, polyurethane-based compositions which are suitable for bonding and sealing applications in the manufacturing industry and in the construction sector, and which exhibit high resistance to fuels.

PRIOR ART

Moisture-curing adhesives and sealants based on polyurethane have long been in use in industrial manufacture and in construction products in order, for example, to bring about elastic bonding and sealing of joints. Besides the reactive, crosslinkable polyurethane prepolymers, such polyurethane-based compositions normally include a relatively large quantity of further substances. These substances include, in particular, plasticizers, which allow effective processing through a reduction in viscosity prior to curing and which also, for example, endow the cured compositions with high elastic extensibility and low elasticity modulus, which are important for joint seals. Depending on application, however, it is necessary to ensure that mobile components in particular, such as the plasticizer, are not over time lost from the cured composition to the environment by migration, into the bond substrate or into a surrounding medium, for example, or are not washed out by water. Typical plasticizers which are used in polyurethane compositions are relatively resistant toward such instances of migration and washout, since they are highly compatible with the polyurethane matrix and dissolve poorly in water or typical substrates. For certain applications, nevertheless, the conventional compositions are not sufficient. Sealing and jointing of fuel tanks or fuel lines, for catch containers, and also concrete seals on filling stations and airfields, for example, are in some cases in continual contact with fuels such as gasoline and kerosene, and such environments pose major challenges to polyurethane compositions. The conventional, water-insoluble plasticizers are rapidly washed out by the fuels, resulting in severe embrittlement or contraction of the adhesive and sealant as soon as the fuel has evaporated. Conversely, under major exposure to fuel, the conventional polyurethane compositions undergo severe and usually irreversible swelling, thus leading to mechanical and esthetic problems. Fuel-resistant plasticizers for plastics are in fact known. However, they are usually not suitable for polyurethane compositions, since they are not compatible with the polyurethane prepolymers and other constituents that are typically employed and they consequently lead to plasticizer exudation and have deficient mechanical properties or cannot even be formulated at all. The adjuvants used to date for fuel-resistant polyurethane compositions, for achieving effective fuel resistance, are usually highly toxic asphaltic or tar-oil substances. Other compositions used for fuel-resistant seals of this kind, such as silicones, for example, in turn have disadvantages over polyurethanes, such as significantly higher costs, comparatively poorer adhesion, on concrete, for example; a narrower spectrum of mechanical performance, or lack of coatability. Consequently there continues to be a need for polyurethane compositions which are free from toxic asphaltic oils and tar oils, can be employed as elastic adhesives and sealants, and, on exposure to fuel, do not exhibit significant plasticizer migration or plasticizer washout, and do not become brittle, contract, or suffer irreversible swelling.

EXPOSITION OF THE INVENTION

It is an object of the present invention, therefore, to provide a fuel-resistant polyurethane adhesive or sealant which under the influence of fuels does not suffer any substantially loss of plasticizer and which, after it has cured, in preferred embodiments, exhibits neither irreversible swelling nor contraction, and exhibits no embrittlement, under the influence of fuel.

It has surprisingly now been found that compositions as claimed in claim 1 achieve this object. The use of sulfonamide plasticizers in polyurethane compositions as claimed in claim 1 leads to an unexpectedly high resistance toward fuels, in association with surprisingly good compatibility and with very low migration or washout of these plasticizers from the polyurethane composition. If fuel is taken up into compositions of the invention, the process is largely reversible and does not adversely affect the function of the cured polyurethane composition. In preferred embodiments, the cured polyurethane compositions of the invention are dimensionally stable even under prolonged fuel exposure, do not swell, or do not swell substantially, and do not lose any substantial amounts of plasticizers through washout. In other preferred embodiments, while there is swelling on severe exposure to fuel, there is again no substantial plasticizer washout and the process is largely reversible. This effect leads to a temporary strengthening of the sealing pressure during reversible swelling, and that may be extremely advantageous, for example, for joint seals in bunds for large quantities of emerging fuel.

The polyurethane composition of the invention has good application properties and, after curing, forms an elastic material of high strength and robustness.

Further aspects of the invention are subjects of further independent claims. Particularly preferred embodiments of the invention are subjects of the dependent claims.

CERTAIN EMBODIMENTS OF THE INVENTION

A subject of the invention is a polyurethane composition comprising
  a) 5 to 40 wt %, based on the overall polyurethane composition, of at least one polyol P;
  b) 25 to 75 wt %, based on the overall polyurethane composition, of at least one filler F;
  c) 0.5 to 10 wt %, based on the overall polyurethane composition, of at least one polyisocyanate I;
  d) 10 to 40 wt %, based on the overall polyurethane composition, of at least one plasticizer W;
  characterized in that the plasticizer W comprises at least one sulfonamide.

Substance names beginning with "poly", such as polyol or polyisocyanate, in the present document identify substances which formally contain two or more per molecule of the functional groups that occur in their name.

The term "polymer" in the present document encompasses on the one hand a collective of chemically uniform macromolecules which nevertheless differ in respect of degree of polymerization, molar mass, and chain length, this collective having been prepared through a polymerization reaction (chain growth addition polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically nonuniform. The term, moreover, further embraces what are called prepolymers, these being reactive oligomeric preadducts whose functional groups have participated in the construction of macromolecules.

The term "polyurethane polymer" encompasses all polymers which are prepared by the process known as the diisocyanate polyaddition process. This also includes those polymers which are virtually or entirely free from urethane groups. Examples of polyurethane polymers are polyether-polyurethanes, polyester-polyurethanes, polyether-polyureas, polyureas, polyester-polyureas, polyisocyanurates, and polycarbodiimides.

"Molecular weight" is understood in the present document to refer to the molar mass (in grams per mole) of a molecule. The "average molecular weight" is the number average $M_n$ of an oligomeric or polymeric mixture of molecules, and is determined customarily by means of gel permeation chromatography (GPC) against polystyrene as standard. "Room temperature" in the present document is a temperature of 23° C. Percentages by weight, abbreviated to wt %, denote mass fractions of a constituent of a composition, based on the overall composition, unless otherwise indicated. The terms "mass" and "weight" are utilized synonymously in the present document. "Fuels" for the purposes of the present document are pure substances or mixtures which are present in liquid form at room temperature (23° C.) under a pressure of 1 bar and which consist primarily of linear, branched and/or aromatic hydrocarbons having typically approximately 5 to approximately 25 carbon atoms. They include, for example, gasoline (spark-ignition fuel), diesel oil, kerosene, light benzine, petroleum, or heavy oil.

The polyurethane composition of the invention comprises at least one polyol P. Suitable polyols P are, in particular, polyether polyols, styrene-acrylonitrile-grafted polyether polyols, polyester polyols, polycarbonate polyols, poly(meth)acrylate polyols, polyhydroxy-functional fats and oils, or polyhydrocarbon polyols, and also mixtures of these polyols. Preference is given to using polyether polyols and polyester polyols. The most preferred are polyester polyols.

Especially suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran, or mixtures thereof, optionally polymerized with the aid of a starter molecule having two or more active hydrogen atoms, such as water, ammonia, for example, or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the stated compounds. Use may be made both of polyoxyalkylene polyols which have a low degree of unsaturation (measured as per ASTM D-2849-69 and expressed in milliequivalents of unsaturation per gram of polyol (meq/g)), prepared for example by means of double metal cyanide complex catalysts (DMC catalysts), and of polyoxyalkylene polyols having a higher degree of unsaturation, prepared for example by means of anionic catalysts such as NaOH, KOH, CsOH, or alkali metal alkoxides.

Particularly suitable are polyoxyethylene polyols and polyoxypropylene polyols, more particularly polyoxyethylene diols, polyoxypropylene diols, polyoxyethylene triols, and polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxyethylene diols, polyoxyethylene triols, polyoxypropylene diols, and polyoxypropylene triols having a molecular weight of 400 to 20 000 g/mol.

Likewise particularly suitable are so-called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, to further alkoxylation with ethylene oxide after the end of the polypropoxylation reaction, and which therefore have primary hydroxyl groups. Preferred in this case are polyoxypropylene-polyoxyethylene diols and polyoxypropylene-polyoxyethylene triols.

Especially suitable as polyester polyols are polyesters which carry at least two hydroxyl groups and are prepared by known processes, particularly by the polycondensation of hydroxycarboxylic acids or the polycondensation of aliphatic and/or aromatic polycarboxylic acids with dihydric or polyhydric alcohols.

Especially suitable polyester polyols are those prepared from di- to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or mixtures of the aforesaid alcohols, with organic dicarboxylic acids or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid, and trimellitic anhydride, or mixtures of the aforesaid acids, and also polyester polyols of lactones such as ε-caprolactone, for example.

Particularly suitable are polyester diols, especially those prepared from adipic acid, azelaic acid, sebacic acid, dodecanedicarboxylic acid, dimer fatty acid, phthalic acid, isophthalic acid, and terephthalic acid as dicarboxylic acid, or from lactones such as ε-caprolactone, for example, and from ethylene glycol, diethylene glycol, neopentyl glycol, 1,4-butanediol, 1,6-hexanediol, dimer fatty acid diol, and 1,4-cyclohexanedimethanol as dihydric alcohol.

Especially suitable polycarbonate polyols are those obtainable by reaction, for example, of the abovementioned alcohols, used for synthesis of the polyester polyols, with dialkyl carbonates such as dimethyl carbonate, diaryl carbonates such as diphenyl carbonate, or phosgene. Particularly suitable are polycarbonate diols, especially amorphous polycarbonate diols.

Other suitable polyols are poly(meth)acrylate polyols.

Additionally suitable are polyhydroxy-functional fats and oils, examples being natural fats and oils, more particularly castor oil, or so-called oleochemical polyols, obtained through chemical modification of natural fats and oils, the epoxy polyesters and epoxy polyethers that are obtained, for example, by epoxidation of unsaturated oils and subsequent ring opening with carboxylic acids or with alcohols, respectively, or polyols obtained by hydroformylation and hydrogenation of unsaturated oils. Further suitable are polyols obtained from natural fats and oils by degradation processes such as alcoholysis or ozonolysis and subsequent chemical linkage, by transesterification or dimerization, for example, of the resultant degradation products or derivatives thereof. Especially suitable degradation products of natural fats and oils are fatty acids and fatty alcohols and also fatty acid esters, more particularly the methyl esters (FAME), which may be derivatized, for example, by hydroformylation and hydrogenation to form hydroxy-fatty acid esters.

Likewise suitable, moreover, are polyhydrocarbon polyols, also called oligohydrocarbonols, examples being polyhydroxy-functional ethylene-propylene, ethylene-butylene or ethylene-propylene-diene copolymers, as produced for example by Kraton Polymers, USA, or polyhydroxy-functional copolymers of dienes such as 1,3-butadiene or diene mixtures and vinyl monomers such as styrene, acrylonitrile or isobutylene, or polyhydroxy-functional polybutadiene polyols, examples being those which are prepared by oxidation of polybutadiene or copolymerization of 1,3-butadiene and allyl alcohol and which may also have been hydrogenated.

Additionally suitable are polyhydroxy-functional acrylonitrile/butadiene copolymers of the kind preparable, for example, from epoxides or amino alcohols and carboxyl-terminated acrylonitrile/butadiene copolymers, which are available commercially under the name Hypro® CTBN from Emerald Performance Materials, LLC, USA.

These stated polyols preferably have an average molecular weight of 250 to 30 000 g/mol, more particularly of 1000 to 20 000 g/mol, and an average OH functionality in the range from 1.6 to 3.

In one preferred embodiment of the polyurethane composition of the invention, the polyol P comprises at least one polyether polyol, and preferably consists of at least one polyether polyol. This embodiment, admittedly, tends towards swelling of the cured composition, in a ground joint, for example, under the influence of fuel. This increases the spatial volume of the composition, since significant amounts of fuel migrate into the composition. This swelling, however, is reversible. As soon as there is no longer any fuel contact, the swelling is reduced again by emigration and evaporation of the fuel, while insubstantial portions, or no portions, of other constituents, such as plasticizers W, for example, are carried or washed out. As a result, for example, embodiments of this kind are particularly suitable for the sealing of bunds in refineries or filling stations, where large quantities of fuels can leak out in the event of an accident. The increased pressure generated by the swelling of a joint seal of the invention may, temporarily, substantially improve the sealing of the bund, this being particularly important when large quantities of fuel are pressing on the seal. Following removal of the fuel from the bund, the seal then rapidly contracts, within a few hours, for example, back to its substantially original form, without significant fractions of plasticizer having been washed out and hence necessitating the replacement of the seal.

In another, particularly preferred embodiment of the polyurethane composition of the invention, the polyol P comprises at least one polyester polyol, and preferably it consists of at least one polyester polyol. The advantage of this embodiment is that only insubstantial quantities of fuel migrate into the cured composition, and at the same time only insubstantial quantities, or none, of constituents of the composition, such as plasticizers W, for example, emigrate from the composition or are washed out. As a result, this embodiment is especially robust and dimensionally stable under exposure to fuel, so making it useful with particular advantage, for example, as ground joints in the context of filling stations and airports or in garages or vehicle workshops.

Further to these stated polyols it is possible as well to use small amounts of low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher alcohols, low molecular weight alkoxylation products of the aforesaid dihydric and polyhydric alcohols, and also mixtures of the aforesaid alcohols, when preparing the polyurethane polymer having terminal isocyanate groups.

The at least one polyol P is present in the composition of the invention with an amount of 5 to 40 wt %, preferably 10 to 30 wt %, based on the overall composition.

The polyurethane composition of the invention further comprises at least one polyisocyanate I.

As polyisocyanates I for the preparation of the polyurethane polymer in the composition of the invention it is possible to use commercially customary polyisocyanates, more particularly diisocyanates.

Suitable polyisocyanates I are aromatic di- or triisocyanates, more particularly diphenylmethane 4,4'- or 2,4'- or 2,2'-diisocyanate or any desired mixtures of these isomers (MDI), tolylene 2,4- or 2,6-diisocyanate or any desired mixtures of these isomers (TDI), mixtures of MDI and MDI homologs (polymeric MDI (PMDI)), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), tris(4-isocyanatophenyl)methane or tris(4-isocyanatophenyl) thiophosphate. Further suitable polyisocyanates I are aliphatic, cycloaliphatic, or arylaliphatic di- or triisocyanates, more particularly tetramethylene 1,4-diisocyanate, 2-methylpentamethylene 1,5-diisocyanate, hexamethylene 1,6-diisocyanate (HDI), 2,2,4- and/or 2,4,4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- and/or -2,6-diisocyanatocyclohexane ($H_6$TDI), 1-isocyanato-3,3,5-trimethyl-5-isocyanatomethylcyclohexane (IPDI), perhydrodiphenylmethane 2,4'- and/or -4,4'-diisocyanate ($H_{12}$MDI), 1,3- or 1,4-bis (isocyanatomethyl)cyclohexane, m- or p-xylylene diisocyanate, tetramethylxylylene 1,3- or 1,4-diisocyanate, 1,3,5-tris (isocyanatomethyl)benzene, bis(1-isocyanato-1-methylethyl)naphthalene, dimer or trimer fatty acid isocyanates such as, in particular, 3,6-bis(9-isocyanatononyl)-4,5-di(1-heptenyl)cyclohexene (dimeryl diisocyanate). Further suitable polyisocyanates I are oligomers or derivatives of the stated di- or triisocyanates, more particularly derived from MDI or TDI or HDI or IPDI, especially oligomers containing uretdione groups or isocyanurate groups or iminooxadiazinedione groups, or various of these groups; or di- or polyfunctional derivatives containing ester or urea or urethane or biuret or allophanate or carbodiimide or uretonimine or oxadiazinetrione groups, or various of these groups. In practice, such polyisocyanates customarily represent mixtures of substances having different degrees of oligomerization and/or different chemical structures. In particular they have an average NCO functionality of 2.1 to 4.0.

Proportionally, the polyisocyanate I may also comprise polyurethane polymers containing isocyanate groups and obtained from the reaction of polyols, especially polyols P, with diisocyanates, as described below.

Preferred as polyisocyanate I are aromatic polyisocyanates, especially monomeric or oligomeric or polymeric MDI or TDI.

In the composition of the invention, polyisocyanate I is present in an amount of 0.5 wt % to 10 wt %, more particularly in an amount of 0.7 wt % to 5 wt %, more preferably 1 wt % to 3 wt %, based on the overall composition.

The polyol P and the polyisocyanate I of the composition of the invention react to form a polyurethane polymer. Depending on the form of application, a polyurethane polymer of this kind may already be present in a form having undergone preliminary reaction. This is especially the case in one-component embodiments, where a composition mixed ready for application can be applied directly from the can without further mixing operations. In that case there are polyurethane polymers in the mixture that contain isocyanate groups. This means that the polyurethane polymers at least primarily have isocyanate groups at their chain ends which react, during and after application, with moisture and undergo crosslinking with other isocyanate groups to form urea groups. For embodiments of this kind it is advantageous if polyol P and polyisocyanate I are reacted initially under controlled conditions to form polyurethane polymers containing isocyanate groups, these polymers then being introduced as such into the compositions. This reaction can be brought about by reacting the polyol P and the polyisocyanate I by customary methods, as for example at temperatures of 50° C. to 100° C., optionally with accompanying use of suitable catalysts, with the polyisocyanate I being metered such that its isocyanate groups are present in a stoichiometric excess in relation to the hydroxyl groups of the polyol P. In particular the excess of polyisocyanate I is selected such that in the resulting polyurethane polymer, after the reaction of all hydroxyl groups of the polyol P, the free isocyanate group content remaining is 0.1 to 5 wt %, preferably 0.2 to 3 wt %, more preferably 0.3 to 2.5 wt %, based on the overall polymer.

The polyurethane polymer containing isocyanate groups may optionally be repaired with accompanying use of plasticizers W.

Preference is given to polyurethane polymers, having the stated free isocyanate group content, which are obtained from the reaction of diisocyanates with high molecular mass diols in an NCO:OH ratio of 1.3:1 to 4:1, more particularly 1.5:1 to 3:1, and very preferably 1.7:1 to 2.5:1.

The polyurethane composition of the invention further comprises at least one plasticizer W. This plasticizer usually comprises a mixture of different substances. This plasticizer W comprises at least one sulfonamide of formula (I).

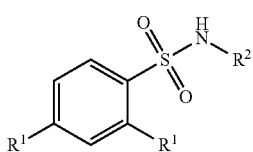
(I)

In this formula, the radicals $R^1$ independently of one another are a hydrogen atom or a methyl group, and the radical $R^2$ is a linear or branched alkyl radical having 1 to 12 carbon atoms and optionally containing ether oxygen; preferably it is a butyl radical.

Preferred sulfonamide plasticizers are N-alkylated para-toluenesulfonamides, N-alkylated ortho-toluenesulfonamides, and N-alkylated benzenesulfonamides. Particularly preferred is N-butylbenzenesulfonamide. It is obtainable, for example, under the trade name Proviplast 024 from Proviron, The Netherlands, or under the trade name Uniplex 214 from Lanxess, Germany.

Such sulfonamide plasticizers are often traded in purity grades known as technical grades, and may, due to synthesis, include various chemical substances. Hence it is entirely possible, for example, for there to be mixtures containing, for example, different radicals $R^2$ as per formula (I) in the sulfonamide plasticizer. For application in accordance with the invention, however, this is immaterial.

The plasticizer W may consist only of one or more sulfonamides of formula (I), or there may be further plasticizers used additionally.

Suitable additional plasticizers are, in particular, esters of organic carboxylic acids, more particularly phthalates such as diisononyl phthalate or diisodecyl phthalate, hydrogenated phthalates such as diisononyl 1,2-cyclohexanedicarboxylate, adipates such as dioctyl adipate, azelates and sebacates, or esters of organic phosphoric and sulfonic acids, or hydrocarbons such as polybutenes or polyisobutenes. Preferred as additional plasticizers are phthalates, hydrogenated phthalates, or adipates. Most preferred are diisononyl phthalate, diisodecyl phthalate, or diisononyl 1,2-cyclohexanedicarboxylate.

In one particularly preferred embodiment of the polyurethane composition of the invention, the plasticizer W comprises N-butylbenzenesulfonamide or consists of N-butylbenzenesulfonamide.

The plasticizer W content of the composition is in the range from 10 wt % to 40 wt %, more particularly 12.5 wt % to 35 wt %, very preferably 15 wt % to 30 wt %, based on the overall composition.

It is highly advantageous if in the case of mixtures of different plasticizers, the sulfonamide content of plasticizer W accounts for the major part. With preference, plasticizer W consists of more than 50 wt % of sulfonamide, preferably more than 75 wt %, more preferably more than 90 wt % of sulfonamide, based on the overall plasticizer W. A higher fraction of sulfonamide typically results in a greater fuel resistance. On the other hand, however, it may be advantageous to admix small fractions of other plasticizers, for reasons, for example, of the mechanical properties or the workability, and also with economic considerations in mind.

The polyurethane composition of the invention further comprises at least one filler F. Suitability as filler F is possessed in particular by natural, ground, or precipitated chalks (consisting wholly or primarily of calcium carbonate), optionally coated with fatty acids, more particularly stearates; barium sulfate ($BaSO_4$, also called barytes or heavy spar), calcined kaolins, aluminum oxides, aluminum hydroxides, silicas, especially finely divided silicas from pyrolysis processes, carbon blacks, especially industrially manufactured carbon black, PVC powders, zeolites, or hollow bead spheres. Preferred fillers are calcium carbonates, calcined kaolins, carbon black, finely divided silicas, and also flame-retardant fillers, such as hydroxides or hydrates, more particularly hydroxides or hydrates of aluminum, preferably aluminum hydroxide.

It is entirely possible, and may even be an advantage, to use a mixture of different fillers. Particularly preferred as fillers are ground calcium carbonates, calcined kaolins, or carbon black. Most preferable are combinations of ground calcium carbonates or calcined kaolins and carbon black.

The filler F content of the composition is in the range from 25 wt % to 75 wt %, more particularly 30 wt % to 70 wt %, very preferably 35 wt % to 65 wt %, based on the overall composition.

The composition of the invention preferably further comprises at least one catalyst for the crosslinking of polyurethanes. This catalyst catalyzes in particular the reaction of isocyanate groups with hydroxyl groups and/or water. Suitability as catalyst is possessed by basic compounds of nitrogen or of phosphorus such as imidazoles, pyridines, phosphazene bases or, in particular, amines, hexahydrotriazines, amidines, guanidines, or biguanides. Particularly suitable are tertiary amines—in the case of one-component formulations, more particularly those with a pKa of below 10. Suitable amine catalysts are, for example, N-ethyldiisopropylamine, N,N,N',N'-tetramethylalkylenediamines, 1,4-diazabicyclo[2.2.2]octane, 2,2'-dimorpholinodiethyl ether (DMDEE), and derivatives thereof with substituents on the morpholine rings. Particularly preferred are DMDEE and 1,4-diazabicyclo[2.2.2]octane.

Additionally of suitability as catalyst are metal compounds, especially organotin(IV) compounds, organotitanates or organozirconates. Particularly preferred are organotin(IV) compounds. Suitability as organotin(IV) compound is possessed in particular by dialkyltin oxides, dialkyltin dichlorides, dialkyltin dicarboxylates, and dialkyltin diketonates, preferably dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate, or dioctyltin diacetylacetonate.

The catalyst content of the composition is preferably in the range from 0.001 wt % to 2 wt %, more particularly 0.01 wt % to 1.0 wt %, more preferably 0.05 wt % to 0.5 wt %, based on the overall composition. For metal catalysts the preferred content is in particular between 0.001 wt % and 0.5 wt %, more preferably between 0.005 and 0.25 wt %, based on the overall composition. For amine catalysts the preferred content is in particular between 0.05 wt % and 2 wt %, more preferably between 0.1 and 1 wt %, based on the overall composition.

The composition of the invention further comprises preferably at least one silane adhesion promoter. The compounds involved are individual or mixed organoalkoxysilanes possessing at least one nonhydrolyzable organic radical on the silicon atom, that radical preferably including heteroatoms which are able to develop interaction with a substrate and hence adhesion to this substrate by way of free electron pairs or covalent, ionic or other mechanisms. "Nonhydrolyzable" in this context means a silicon-carbon bond, in contrast, for example, to a hydrolyzable silicon-oxygen bond. In the case of bond substrates containing silicon oxide, such as glasses, the silane group of the organoalkoxysilane may also permit covalent bonding to the substrate, via a hydrolysis/condensation reaction, while the organic radical reacts with the adhesive composition by way, for example, of a reaction between any hydroxyl or amine group present and an isocyanate group of a polyurethane polymer.

Suitability as silane adhesion promoter is possessed by organoalkoxysilanes ("silanes") which carry a reactive group on the organic radical, more particularly epoxysilanes, mercaptosilanes, (meth)acrylosilanes, isocyanatosilanes, anhydridosilanes, S-(alkylcarbonyl)mercaptosilanes, aldiminosilanes, or oligomeric forms of these silanes, or adducts of amino- or mercaptosilanes with polyisocyanates.

Preferred are 3-glycidyloxypropyltrimethoxysilane, β-(3, 4-epoxycyclohexyl)ethyltrimethoxysilane, 3-mercaptopropyltrimethoxysilane, or 3-methacryloyloxypropyltrimethoxysilane. The most preferred is 3-glycidyloxypropyltrimethoxysilane.

The silane adhesion promoter content of the composition is preferably in the range from 0.01 wt % to 1.0 wt %, more particularly 0.05 wt % to 0.5 wt %, based on the overall composition.

The polyurethane composition of the invention is, in particular, substantially free from asphalt, bitumen, or tar oils. This means that such substances are present preferably with an amount of less than 0.1 wt %, and in preferred cases are entirely undetectable. Additions likewise preferably not used or used only in insubstantial quantities of below 0.1 wt % during preparation of the polyurethane composition of invention are aliphatic and above all aromatic liquid hydrocarbons such as, for example, extender oils, so-called white spirits or Stoddard solvents, petroleum, and petroleum naphtha.

The composition described preferably comprises further ingredients customary for polyurethane adhesives and sealants, especially further fillers; reactive plasticizers; rheological additives, such as, for example, thickeners, examples being urea compounds of the kind described as thixotropic agents ("thixotropy endowing agent") in WO 02/48228 A2 on pages 9 to 11, polyamide waxes, bentonites, or fumed silicas; adhesion promoter resins; surface-active substances such as, for example, wetting agents, flow control agents, deaerating agents, or defoamers; drying agents such as, for example, p-tosyl isocyanate and other reactive isocyanates, calcium oxide, or molecular sieves; stabilizers to counter heat, light, UV light and oxidation; flame-retardant additives; biocides such as, for example, algaecides or fungicides; and also further such common additives, such as, for example, fibers, of polyethylene, for example; dyes, pigments, or other additives known to the person skilled in the art.

In two-component embodiments of the present invention, certain of the constituents used in the composition of the invention are employed in separate components, which are stored separately from one another and are not mixed until shortly before or during the application of the composition. This procedure enables the constituents that are reactive with one another to be preserved separately, which is advantageous for the shelf life of the composition. Also it is possible to use highly reactive constituents, as for example highly reactive polyisocyanates I, hence permitting more rapid curing of the composition. Furthermore, such embodiments are not tied to moisture for curing through their volume, so permitting more rapid operations which are less affected by climatic fluctuations, such as in atmospheric humidity, for example. It may be advantageous if no substantial excess of polyisocyanate I is present, in order to prevent excessive postcrosslinking as a result of inordinate isocyanate groups, since such postcrosslinking reactions typically lead to higher moduli of elasticity and lower extensibility.

On mixing of the two components, the polyol P reacts with the polyisocyanate I with crosslinking and curing of the composition.

In one preferred embodiment of the polyurethane composition of the invention it is a two-component composition comprising components KA and KB, with the first component KA comprising the at least one polyol P and the second component KB comprising the at least one polyisocyanate I.

One preferred embodiment of a two-component polyurethane composition in accordance with the present invention comprises:

a first component KA, comprising:
- a) 10 to 50 wt %, based on KA, of the at least one polyol P;
- b) 10 to 50 wt %, based on KA, of the at least one plasticizer W;
- c) 25 to 75 wt %, based on KA, of the at least one filler F;
- d) 0 to 2 wt %, preferably 0.01 to 1 wt %, based on KA, of at least one catalyst for the crosslinking of polyurethanes; and a second component KB, comprising
- e) 10 to 100 wt %, based on KB, of the at least one polyisocyanate I;
- f) 0 to 60 wt %, based on KB, of the at least one plasticizer W;
- g) 0 to 60 wt %, based on KB, of the at least one filler F;

with the mass mixing ratio of the two components KA:KB being preferably between 8:1 and 12:1.

The mass mixing ratio of the two components KA and KB that is suitable for individual embodiments is of course dependent on the quantities used of polyol P in KA and polyisocyanate I in KB. The appropriate mixing ratio is advantageously calculated such that there is a slight molar excess of, for example, 10 mol % of isocyanate groups from polyisocyanate I relative to hydroxyl groups from polyol P in the overall composition after mixing. The person skilled in the art in the field of two-component polyurethane compositions is capable of calculating a mass mixing ratio suitable for his or her application.

A composition of this kind is suitable, for example, as a fuel-resistant sealant, as for example for ground joints in concrete in the context of filling stations or the taxiing and waiting area of airports.

Both components KA and KB may contain not only the constituents already mentioned but also further constituents, of the kind known to the person skilled in the art from two-component polyurethane chemistry. Examples of such further constituents have been described earlier on above. They may be present in only one of the components or in both.

As the person skilled in the art of polyurethane adhesives is aware, it is necessary when preparing the components, especially in the case of the polyisocyanate-containing component KB, to ensure that as far as possible the raw materials are free from water and that as far as possible no moisture can come into contact with the component during and after preparation thereof. This is achieved on the one hand by physical or chemical drying of the starting substances, and also by working under inert gas, customarily nitrogen or dry air.

Prior to application, components KA and KB are stored separately from one another and are not mixed until during or immediately before application with one another. The components advantageously are present in a pack which consists of two mutually separate chambers, more specifically such that the polyol component KA is present in one chamber and the polyisocyanate component KB is present in the other chamber. Components KA and KB are introduced into the chambers in the pack and are provided with airtight and moisture-tight sealing.

Preferred packaging of this kind comprises, on the one hand, side-by-side dual cartridges or coaxial cartridges, in which two tubular chambers are arranged alongside one another or within one another and are provided with airtight and moisture-tight sealing by pistons. The components can be pressed out of the cartridge via the advancement of these pistons. The sides of the tubes opposite to the pistons are modified, optionally by way of an adapter, in such a way that in the region of the opening, the chamber openings communicate directly with one another via a dividing wall. In the region of the exit opening of the chambers there is advantageously a thread made, allowing a static mixer or a dynamic mixer to be mounted on without leaks. Such packing is preferred in particular for small-scale applications, especially for fill quantities of up to 1 liter.

For larger applications, especially for applications in industrial manufacture, the components KA and KB are advantageously dispensed into and stored in drums or hobbocks. In this case, the components are pressed out via hydraulic presses, in particular by way of follow up plates, and are supplied via lines to a mixing apparatus, of the kind commonly used for two-component adhesives in industrial manufacture.

With any packing it is important that the polyisocyanate component KB at least is provided with airtight and moisture-tight sealing, so that both components can be stored for a long time, i.e., typically longer than 6 months.

One preferred method for adhesively bonding substrates by means of a two-component composition of the invention preferably comprises the following steps:

mixing the above-described components KA and KB;
applying the mixed polyurethane composition to at least one of the substrate surfaces to be bonded, with at least one of the substrate surfaces to be bonded having preferably been earlier treated with an adhesion promoter or primer;
joining within the open time if substrates are movable;
curing the polyurethane composition.

Mixing is accomplished typically via static mixers or with the aid of dynamic mixers. At the mixing stage it is important to ensure that the two components are mixed as homogeneously as possible. If the two components are poorly mixed, there are local deviations from the optimum mixing ratio—i.e., substantially stoichiometric—and this has the consequence of an impairment in mechanical properties of the cured polyurethane composition. In order to assess the quality of mixing from a visual standpoint as well it is advantageous if the two components KA and KB have two different colors, which can be distinguished well visually from one another and also from the mixture. An example of a color combination of this kind is when one component is black and the other is white. Effective mixing is present when there is a homogeneous grey color and there are no streaks or patterns in light or dark grey or in white or black.

The mixed polyurethane composition is applied to at least one substrate surface that is to be bonded or sealed. The substrate to be bonded or sealed is preferably concrete, metal, a plastic, a glass, or a ceramic. Typically there are two substrates intended for bonding or sealing. It is possible for the partner adherend, i.e., the second substrate, to be identical to or different from the first substrate. A composition of the invention of this kind may be used in particular as a connection joint or ground joint for concrete. After joining has taken place, the polyurethane composition is cured.

This produces an assembly of the adherends, with the adhesive and sealant non-positively connecting these adherends to one another. The cured composition of the invention here is able at least partly to compensate movements in the substrate, arising for example from thermal expansion, through elastic extension, without the joint rupturing or detaching.

In another preferred embodiment of the polyurethane composition of the invention, the composition is a one-component composition, therefore comprising only one single component. An advantage of this embodiment is that application is particularly simple and user-friendly, since there is no need for a mixing operation during application.

One preferred embodiment of a one-component polyurethane composition according to the present invention comprises:
- a) 5.5 to 50 wt %, based on the overall composition, of at least one isocyanate-functional polyurethane polymers PR, obtained from the at least one polyol P and the at least one polyisocyanate I;
- b) 10 to 40 wt %, based on the overall composition, of the at least one plasticizer W;
- c) 25 to 75 wt %, based on the overall polyurethane composition, of the at least one filler F; and
- d) 0 to 2 wt %, preferably 0.01 to 1 wt %, based on the overall polyurethane composition, of at least one catalyst for the crosslinking of polyurethanes.

A composition of this kind is suitable, for example, as a fuel-resistant sealant, as for example for the jointing of fuel tanks, fuel lines or catch containers, or for ground joints on concrete in the context of filling stations or the taxiing and waiting area of airports.

The one-component composition of the invention may comprise further constituents, in addition to those already mentioned, of the kind known to the person skilled in the art from one-component polyurethane chemistry. Examples of such further constituents have been described earlier on above.

As the person skilled in the art of polyurethane adhesives is aware, it is important, when producing the one-component composition of the invention, to ensure that as far as possible the raw materials are free from water and that during and after preparation thereof as little moisture as possible is able to come into contact with the composition. This is achieved on the one hand by physical or chemical drying of the starting substances, and also by working under inert gas, customarily nitrogen or dry air.

Following preparation, the one-component composition of the invention is introduced into suitable packaging and provided with airtight and moisture-tight sealing.

Preferred such packing is, on the one hand, cartridges, made for example from largely air-impermeable plastics, coated plastics, or aluminum. Such packings are preferred in particular for small-scale applications, more particularly for fill quantities of up to 1 liter.

For larger applications, especially for applications in industrial manufacture, the one-component composition of the invention is dispensed into and stored in—advantageously—pouches, drums, or hobbocks.

With any packing it is important that the one-component composition is provided with airtight and moisture-tight sealing, allowing it to be stored over a long time, i.e., typically longer than 6 months.

One preferred method for adhesively bonding substrates by means of a one-component composition of the invention preferably comprises the following steps:
- applying the one-component polyurethane composition to at least one of the substrate surfaces to be bonded, with at least one of the substrate surfaces to be bonded having preferably been earlier treated with an adhesion promoter or primer;
- joining within the open time if substrates are movable;
- curing the polyurethane composition.

The one-component polyurethane composition of the invention is applied to at least one of the substrate surfaces to be bonded or sealed. The substrate to be bonded or sealed is preferably concrete, asphalt, metal, a plastic, a glass, or a ceramic. Typically there are two substrates intended for bonding or sealing. It is possible for the partner adherend, i.e., the second substrate, to be identical to or different from the first substrate. A composition of the invention of this kind may be used in particular as a connection joint or ground joint for concrete. After joining has taken place, the polyurethane composition is cured.

This produces an assembly of the adherends, with the adhesive and sealant non-positively connecting these adherends to one another. The cured composition of the invention here is able at least partly to compensate movements in the substrate, arising for example from thermal expansion, through elastic extension, without the joint rupturing or detaching.

Particularly in the case of one-component embodiments of the present invention, water or moisture is needed for curing. The water or moisture may come from the air (atmospheric humidity), in which case the composition cures through the diffusion of the moisture from outside to inside. The composition, alternatively, may be contacted with a water-containing component—by means, for example, of being coated, with a smoothing agent, for example, by being sprayed, or by means of immersion methods, or a water-containing component may be added to the composition, this component being, for example, in the form of a hydrous paste, which is mixed homogeneously or heterogeneously with the composition by way of a static mixer, for example.

The composition of the invention possesses long keeping qualities, meaning that it is storage-stable over a relatively long time. "Storage-stable" or "storable" applies to a composition which can be preserved at room temperature in a suitable container for a relatively long time, typically at least 3 months up to 6 months or more, without suffering alteration in its application properties or service properties, more particularly the viscosity, the extrusion force required on application from the container, and the crosslinking rate, as a result of the storage process, to an extent relevant for its service.

The composition of the invention preferably has a paste-like consistency with properties of structural viscosity. A composition of this kind is applied to the substrate by means of a suitable apparatus, as for example from a cartridge or by means of a toothed applicator from a larger container. A composition of the invention having good application properties preferably has high sag resistance and short stringing, and also low viscosity and/or extrusion force. This means that it can be spread with the toothed applicator with little force, remains standing in the form applied after application, and hence does not disperse, and forms no string or only a very short string when the application equipment is removed, so that the substrate is not soiled.

The composition of the invention is applied in particular in a temperature range between 5° C. and 45° C., preferably in the region of the ambient temperature, and also cures under these conditions. Optionally it is heated before application, to a temperature, for example, in the range from 20°

C. to 100° C., more particularly 40° C. to 80° C., by means, for example, of a cartridge oven.

The present invention further encompasses the use of an above-described composition as an adhesive or sealant. Use as a joint sealant is preferred. In all embodiments, the composition of the invention is suitable especially for application to concrete, mortar, brick, tile, plaster, a natural stone such as granite or marble, glass, glass-ceramic, screen-printed ceramic, a metal or a metal alloy, wood, a plastic, or a painted material. The embodiments of the present invention possess high fuel resistance.

The present invention relates, moreover, to the use of a polyurethane composition of the invention for the bonding and/or sealing of concrete. Preferred is the use for bonding and/or sealing concrete in a garage or a building of a filling station, of a tank farm, of a fuel container, or of an airport. At such locations it is likely that a joint sealant will come into contact with gasoline, kerosene, or other fuels.

Further preferred is the use as a sealant for ground joints in civil engineering.

Additionally, the present invention relates to a building or article of manufacture, especially comprising concrete, which has been bonded or sealed with a polyurethane composition of the invention.

A further subject of the present invention is a cured polyurethane composition of the invention. Such a composition is obtained after the polyurethane composition has come into contact with moisture or, in the case of a two-component composition, after mixing of the two components KA and KB.

Examples

Given below are working examples which are intended to elucidate in more detail the invention described. The invention is of course not confined to these working examples described.

Description of Measurement Methods

The Shore A hardness was determined according to DIN 53505, measured after 14 days of standard conditions ("SC"; 23° C., 50% relative humidity) on disc-shaped test specimens having a diameter (circle) of 42 mm and a thickness (height) of 6 mm.

The change in mass after fuel exposure was measured using a balance. The fuel exposure tests were carried out using the Shore A test specimens. These test specimens were each placed for 24 hours into 100 ml of a white spirit mixture (70 volume percent isooctane (2,2,4-trimethylpentane) and 30 volume percent toluene), the specimens necessarily being covered by at least 6 mm of white spirit. Following removal, the test specimens were briefly wiped superficially dry with a paper cloth and immediately weighed. This value shows the increase in weight from uptake of fuel. Thereafter the test specimens were left to dry for 24 hours under standard conditions (23° C., 50% relative humidity) and weighed again. This value shows the final weight after evaporation of the fuel which had been taken up, and hence shows the loss of plasticizer by washout in the course of storage in fuel.

The volume change after fuel exposure was measured by means of a caliper gauge likewise on the Shore A test specimens before and after fuel exposure. Measurements in this case were made of the diameter and the thickness of each of the specimens.

Raw Materials Used

Table 1 shows the raw materials used for the experiments, and their function in the compositions.

TABLE 1

Raw materials used.

| Raw material | Manufacturer/source | Function |
|---|---|---|
| Desmophen ® 1652 | Covestro | Polyol P (polyester polyol) |
| Voranol ® CP 4755 | Dow Chemical | Polyol P (polyether polyol) |
| Proviplast ® 024 | Proviron Fine Chemicals | Plasticizer W (sulfonamide) |
| Freeflex ® DEPG | Caffaro Industrie S.p.A. | Plasticizer W (benzoate) |
| Disflamoll ® DPK | Lanxess | Plasticizer W (phosphate) |
| Jayflex ® DIDP | Exxon Mobil | Plasticizer W (phthalate) |
| Omyacarb ® 5GU | Omya AG | Filler F (chalk) |
| DABCO ® 33LV | Air Products & Chemicals | Catalyst |
| Metatin ® 712 | Dow Chemical | Catalyst |
| Desmodur ® VK 10 | Covestro | Polyisocyanate I |

Production and Measurement of Compositions V1, V2 and R1-R8 (Two-Component)

Two inventive (V1 and V2) and also 8 reference compositions (R1 to R8) were produced in accordance with the masses (in g) reported in table 2.

For each example, this was done by first preparing a component KA, by mixing the respective ingredients thereof (polyol P, plasticizer W, filler F, and catalyst) in a vacuum mixer to form a homogeneous, storable composition. Thereafter component KB (consisting of polyisocyanate I) was added to component KA and mixed in under reduced pressure for 20 minutes at 1000-1200 revolutions, to give a homogeneous paste. This paste was then used to produce the test specimens.

TABLE 2

Example formulas with constituents in g. V1 and V2 are inventive, R1 to R8 are not inventive.

| Constituents [g] | V1 | R1 | R2 | R3 | V2 | R4 | R5 | R6 | R7 | R8 |
|---|---|---|---|---|---|---|---|---|---|---|
| Component KA: | | | | | | | | | | |
| Desmophen 1652 | 15 | 15 | 15 | 15 | — | — | — | — | 15 | 15 |
| Voranol CP 4755 | — | — | — | — | 15 | 15 | 15 | 15 | — | — |
| Proviplast 024 | 19.8 | — | — | — | 19.8 | — | — | — | — | — |
| Freeflex DEPG | — | 19.8 | — | — | — | 19.8 | — | — | — | 19.8 |
| Disflamoll DPK | — | — | 19.8 | — | — | — | 19.8 | — | 24.8 | — |
| DIDP | — | — | — | 19.8 | — | — | — | 19.8 | — | — |
| Omyacarb 5GU | 65 | 65 | 65 | 65 | 65 | 65 | 65 | 65 | 60 | 65 |
| DABCO 33LV | 0.2 | 0.2 | 0.2 | 0.2 | 0.2 | 0.2 | 0.2 | 0.2 | 0.2 | 0.2 |

TABLE 2-continued

Example formulas with constituents in g. V1 and
V2 are inventive, R1 to R8 are not inventive.

| Constituents [g] | V1 | R1 | R2 | R3 | V2 | R4 | R5 | R6 | R7 | R8 |
|---|---|---|---|---|---|---|---|---|---|---|
| Component KB: | | | | | | | | | | |
| Desmodur VK 10 | 2.07 | 2.83 | 2.07 | 2.07 | 1.35 | 2.12 | 1.35 | 1.35 | 2.06 | 2.07 |

The two-component compositions shown in table 2 show comparable inventive and noninventive examples. Since a plasticizer W with hydroxyl groups was used in the case of experiments R1, R4 and R8, R1 and R4 contain more polyisocyanate, in order to allow the same crosslinking density in the cured composition. Prepared as a comparative at the same time, however, was R8, the composition of which has the original polyisocyanate content of the other compositions based on polyester polyols.

The test results of examples compositions V1, V2 and R1-R8 are summarized in tables 3 and 4. For each composition, a Shore A test specimen was prepared and was cured for 14 days under standard conditions ("14d SC") and weighed a first time. It was then stored in white spirit for 24 hours ("1 d white spirit"), wiped dry with a cloth and weighed a second time. Thereafter it was left to dry under standard conditions in the air for 24 hours ("1 d SC") and weighed a third time. The change in weight, in percent, is based always on the original mass of the test specimen after 14 days of SC but before storage in white spirit.

TABLE 3

Results of the measurements for Shore A hardness and change in weight of the cured example compositions after storage in white spirit.

| Test result | V1 | R1 | R2 | R3 | V2 |
|---|---|---|---|---|---|
| Shore A hardness, 14 d SC | 19 | 26 | 32 | n/v | 20 |
| Mass (g), 14 d SC | 12.966 | 15.953 | 14.866 | n/v | 14.957 |
| Mass (g), 14 d SC + 1 d white spirit | 12.486 | 15.307 | 14.206 | n/v | 16.302 |
| Change in weight (%) | −3.7 | −4.0 | −5.7 | n/v | +8.9 |
| Mass (g), 14 d SC + 1 d white spirit + 1 d SC | 12.318 | 15.107 | 13.824 | n/v | 13.788 |
| Change in weight (%) | −5.0 | −5.3 | −7.0 | n/v | −7.9 |

"n/v": a composition that could be used for test measurements could not be formulated, owing to incompatibility between plasticizer and polyol.

TABLE 4

Results of the measurements for Shore A hardness and change in weight of the cured example compositions after storage in white spirit.

| Test result | R4 | R5 | R6 | R7 | R8 |
|---|---|---|---|---|---|
| Shore A hardness, 14 d SC | 31 | 36 | 41 | 21 | n/v |
| Mass (g), 14 d SC | 12.44 | 16.192 | 14.478 | 14.675 | n/v |
| Mass (g), 14 d SC + 1 d white spirit | 13.392 | 17.653 | 15.461 | 13.621 | n/v |
| Change in weight (%) | +7.7 | +9.0 | +6.9 | −7.2 | n/v |
| Mass (g), 14 d SC + 1 d white spirit + 1 d SC | 11.068 | 14.454 | 12.271 | 13.399 | n/v |
| Change in weight (%) | −11.0 | −10.7 | −15.2 | −8.7 | n/v |

"n/v": a cured composition that could be used for test measurements could not be formulated, because of undercrosslinking.

The results from tables 3 and 4 show that the inventive example V1, with 5% loss of the weight after fuel storage, exhibits the lowest plasticizer washout of all tested compositions based on polyester polyols (V1, R1-R3, R7-R8). It was not possible to measure comparative example R3, since the plasticizer W utilized is not sufficiently miscible with the polyol P used and it was therefore not possible to formulate a composition. R8 could not be measured because the plasticizer used had undergone partial reaction, via its hydroxyl groups, with the polyisocyanate I and consequently the crosslinking density in the cured composition was too low, so that it did not develop sufficient strength and elasticity in the course of curing. R1 corresponds to the same composition but with increased polyisocyanate content to compensate for the plasticizer. R7 is likewise an additional, comparative experiment, in this case with more plasticizer W in order to arrive at the same Shore A hardness as in inventive example V1, since the plasticizer used in R7 has a relatively poor plasticizer activity. R7 is a comparative experiment to R2, which contains the original quantity of plasticizer, but exhibits a much higher Shore A hardness.

The measurements of the Shore A hardness show generally that the inventive examples, when the same quantity of plasticizer was used, gave significantly softer compositions, this being advantageous for a sealant. The plasticizer activity of the plasticizer of the invention when used in equal proportions is therefore the best in comparison to the noninventive plasticizers, for both types of polyol investigated.

With regard to weight increase after white spirit storage, it is found that, irrespective of the plasticizer, there is no substantial uptake of fuel when a polyester polyol is used, since no increase in mass is observed. The inventive example V1, however, shows the lowest washout of plasticizer, both directly after white spirit storage and after subsequent drying.

In the examples with polyether polyols, swelling with increase in mass after spirit storage is observed in all cases. After drying, however, the inventive example V2 clearly shows the smallest loss of mass of all polyether polyol-based compositions, and hence also the most reversible swelling characteristics of all the examples.

Production and Measurement of Compositions V3 and R9 to R11 (One-Component)

One inventive (V3) and also 3 reference compositions (R9 to R11) were produced in accordance with the masses indicated in table 5 (in g).

For this purpose, first of all of polymer PR was prepared by the following method:

500 g of polyoxypropylene diol (Acclaim® 4200 N, Covestro; OH number 28.1 mg KOH/g), 2000 g of polyoxypropylene-polyoxyethylene triol (Caradol® MD34-02, Shell; OH number 35.0 mg KOH/g) and 245 g of tolylene diisocyanate (TDI; Desmodur® T 80 P, Covestro) were reacted at 80° C. to give an NCO-terminated polyurethane polymer PR having a titrimetrically determined free isocyanate group content of 1.88 wt %. This corresponds to the reaction product of the polyol P and the polyisocyanate I of the composition of the invention. The rest of the raw materials used correspond to those listed in table 1.

Subsequently, in a vacuum mixer, the polyurethane polymer PR was introduced under nitrogen together with the plasticizer W, and the filler F was added and mixed in. Thereafter the catalyst was added and mixed in under reduced pressure for 20 minutes at 1000-1200 revolutions, to give a homogeneous paste. This paste was then used to produce the test specimens.

TABLE 5

Example compositions with constituents in g.
V3 is inventive, R9 to R11 are not inventive.

| | Constituents in [g] | | | |
|---|---|---|---|---|
| | V3 | R9 | R10 | R11 |
| Polymer PR | 20 | 20 | 20 | 20 |
| Proviplast 024 | 24.95 | — | — | — |
| Freeflex DEPG | — | 24.95 | — | — |
| Disflamoll DPK | — | — | 24.95 | — |
| DIDP | — | — | — | 24.95 |
| Omyacarb 5GU | 55 | 55 | 55 | 55 |
| Metatin 712 | 0.05 | 0.05 | 0.05 | 0.05 |

The test results of example compositions V3 and R9-R11 are summarized in table 6. For each composition the respective Shore A test specimen was used for the weight measurements after 14 days of SC, after one day of white spirit storage, and also after one day of drying after the white spirit storage. The change in weight in percent is always based on the initial mass of the test specimen after 14 days of SC but before white spirit storage. In addition to this, the volume (or the diameter and the thickness) of the Shore A test specimen was measured after 14 days of SC and also after one day of drying after the white spirit storage, to ascertain the shrinkage due to plasticizer washout. At the same time, on the same Shore A test specimens, the Shore A hardness was measured after 14 days of SC and also after one day of drying after the white spirit storage.

TABLE 6

Results of the measurements for Shore A hardness and change in weight of the cured example compositions after storage in white spirit.

| Test result | V3 | R9 | R10 | R11 |
|---|---|---|---|---|
| Shore A hardness, 14 d SC | 23 | n/v | 35 | 31 |
| Shore A hardness, 14 d SC + 1 d white spirit + 1 d SC | 24 | n/v | 43 | 50 |
| Mass (g), 14 d SC | 13.009 | n/v | 13.743 | 12.701 |
| Mass (g), 14 d SC + 1 d white spirit | 14.657 | n/v | 15.396 | 14.038 |
| Change in weight (%) | 12.7 | n/v | 12.0 | 10.5 |
| Mass (g), 14 d SC + 1 d white spirit + 1 d SC | 12.184 | n/v | 11.993 | 10.566 |
| Change in weight (%) | −6.3 | n/v | −12.7 | −16.8 |
| Diameter (mm)/thickness (mm), 14 d SC | 42/6 | n/v | 42/6 | 42/6 |
| Diameter (mm)/thickness (mm), 14 d SC + 1 d white spirit + 1 d SC | 41/5.9 | n/v | 39.5/5.7 | 37.5/5.4 |

"n/v": a cured composition that could be used for test measurements could not be formulated, because of undercrosslinking.

The results in table 6 show clearly that the inventive composition V3 suffers from the least plasticizer washout. Not only the change in mass after white spirit storage and drying but also the change in volume and the change in the Shore A hardness are much lower for V3 than for the comparative examples. While there is swelling after white spirit storage in all examples, this swelling is nevertheless very largely reversible, as shown by the measurement data after drying. In the case of the noninventive experiments, shrinkage is substantially higher and the decrease in weight is significantly higher, owing to the considerable washout of plasticizer.

In summary it has been shown that inventive compositions based on polyester polyols are substantially more fuel-resistant than their noninventive counterparts, and neither swell nor suffer from substantial loss of plasticizer. Inventive compositions based on polyether polyols do swell, which may be an advantage depending on application; the swelling, however, in contrast to noninventive compositions, is largely reversible and is not accompanied by substantial loss of plasticizer.

The invention claimed is:

1. A polyurethane composition consisting of:
    a) 10 to 40 wt %, based on the overall polyurethane composition, of a polyol P comprising a polyether polyol or a polyester polyol;
    b) 25 to 75 wt %, based on the overall polyurethane composition, of a filler F;
    c) 0.5 to 10 wt %, based on the overall polyurethane composition, of a polyisocyanate I;
    d) 10 to 40 wt %, based on the overall polyurethane composition, of a plasticizer W made exclusively of a sulfonamide selected from the group consisting of: an N-alkylated para-toluenesulfonamide, N-alkylated ortho-toluenesulfonamide, N-alkylated benzenesulfonamide, and combinations thereof, and
    optionally at least one further additive selected from the group consisting of: a silane adhesion promoter, a reactive plasticizer, a urea compound, a polyamide wax, a bentonite, fumed silica, an adhesion promoter resin, a surface-active substance, a drying agent, a stabilizer to counter heat, light, UV light, and oxidation, a flame-retardant additive, a biocide, a fiber, a dye, a pigment, and a catalyst for crosslinking polyurethanes,
    wherein the composition is fuel resistant.

2. The polyurethane composition as claimed in claim 1, wherein the composition is substantially free from asphalt, bitumen, or tar oils.

3. The polyurethane composition as claimed in claim 1, wherein the plasticizer W consists of N butylbenzenesulfonamide.

4. The polyurethane composition as claimed in claim 1, wherein the polyisocyanate I comprises monomeric, oligomeric and/or polymeric diphenylmethane diisocyanate (MDI) or tolylene diisocyanate (TDI).

5. The polyurethane composition as claimed in claim 1, wherein:
    the composition is a single component composition, and the catalyst is present in an amount in a range of from 0 to 2 wt %, based on the overall polyurethane composition; and
    the polyol P and the polyisocyanate I are present in a pre-reacted form as an isocyanate-functional polyurethane polymer PR having a free isocyanate content in a range of from 0.1 and 5 wt. %.

6. The polyurethane composition as claimed in claim 1, wherein the composition is formed of two components: a first component KA comprising the polyol P, and a second component KB comprising the polyisocyanate I.

7. The polyurethane composition as claimed in claim 6, wherein:
    the first component KA comprises:
    a) 10 to 50 wt %, based on KA, of the polyol P;
    b) 10 to 50 wt %, based on KA, of the plasticizer W;
    c) 25 to 75 wt %, based on KA, of the filler F; and d) 0 to 2 wt %, based on KA, of the catalyst for the crosslinking of polyurethanes; and the second component KB comprises:

e) 10 to 100 wt %, based on KB, of the polyisocyanate I;
f) 0 to 60 wt %, based on KB, of the plasticizer W; and
g) 0 to 60 wt %, based on KB, of the filler F;

with a mass mixing ratio of the first and second components KA:KB being between 8:1 and 12:1.

8. A method comprising applying an adhesive or a sealant consisting of the polyurethane composition as claimed in claim 1 onto a substrate.

9. A method comprising bonding and/or sealing a substrate comprising concrete with an adhesive or a sealant consisting of the polyurethane composition as claimed in claim 1.

10. The method according to claim 9, wherein the substrate comprises a garage or a building of a filling station, a tank farm, a fuel container, or an airport.

11. A method comprising applying a sealant consisting of the polyurethane composition as claimed in claim 1 for ground joints in civil engineering.

12. A building or article of manufacture, comprising concrete, which has been bonded or sealed with the polyurethane composition as claimed in claim 1.

13. The building or article of manufacture according to claim 12, wherein the polyurethane composition has been cured on the building or article of manufacture and is in contact with fuel after application and curing.

14. The polyurethane composition as claimed in claim 1, wherein the composition is cured.

15. A sealant or adhesive consisting of the polyurethane composition as claimed in claim 1, wherein the sealant or adhesive is fuel-resistant.

16. The sealant or adhesive as claimed in claim 15, wherein the sealant or adhesive is in contact with fuel after application and curing.

17. A method comprising:

applying a sealant or adhesive consisting of the polyurethane composition according to claim 1 to a substrate; and curing the sealant or adhesive on the substrate, wherein the sealant or adhesive is in contact with fuel after application and curing.

18. The polyurethane composition according to claim 1, wherein the polyol P is the polyester polyol.

19. The polyurethane composition according to claim 1, wherein the polyol P is the polyether polyol.

* * * * *